(12) United States Patent
Kim et al.

(10) Patent No.: US 8,499,375 B2
(45) Date of Patent: Aug. 6, 2013

(54) WASHBASIN

(75) Inventors: Suk-Jin Kim, Gyeonggi-do (KR); Hyun-Soo Kim, Gyeonggi-do (KR)

(73) Assignees: Suk-Jin Kim, Gyeonggi-do (KR); Hyun-Soo Kim, Gyeonggi-do (KR)

( * ) Notice: Subject to any disclaimer, the term of this patent is extended or adjusted under 35 U.S.C. 154(b) by 0 days.

(21) Appl. No.: 13/330,613

(22) Filed: Dec. 19, 2011

(65) Prior Publication Data

US 2012/0084911 A1 Apr. 12, 2012

Related U.S. Application Data

(63) Continuation of application No. PCT/KR2010/002117, filed on Apr. 7, 2010.

(30) Foreign Application Priority Data

Jun. 19, 2009 (KR) .................. 10-2009-0054842

(51) Int. Cl.
*A47K 1/04* (2006.01)

(52) U.S. Cl.
USPC ................ 4/619; 4/631; 4/637; 4/676; 4/678; 239/463

(58) Field of Classification Search
USPC ............. 4/675–678, 654, 619, 631, 630, 643, 4/624, 657; 239/463
See application file for complete search history.

(56) References Cited

U.S. PATENT DOCUMENTS

| | | | | |
|---|---|---|---|---|
| 1,096,021 A * | 5/1914 | Day | ................................ | 239/26 |
| 1,504,623 A * | 8/1924 | Hulla | .............................. | 239/26 |
| 2,026,804 A * | 1/1936 | Sterling | ............................ | 4/642 |
| 2,790,632 A * | 4/1957 | Mellette | .......................... | 239/26 |
| 3,779,467 A * | 12/1973 | Arbon | ............................ | 239/538 |
| 4,122,845 A * | 10/1978 | Stouffer et al. | ............... | 601/160 |
| 5,072,757 A * | 12/1991 | Lin | ................................ | 137/615 |
| 5,412,818 A * | 5/1995 | Chen | ................................. | 4/642 |
| 6,179,130 B1 * | 1/2001 | Nguyen et al. | ................ | 210/424 |
| 6,912,741 B1 * | 7/2005 | Noh | ................................. | 4/675 |

FOREIGN PATENT DOCUMENTS

| | | |
|---|---|---|
| JP | 02672660 | 11/1997 |
| JP | 2001-292920 | 10/2001 |
| JP | 2002-165715 | 6/2002 |
| JP | 2004-057273 | 2/2004 |
| JP | 2004-298436 | 10/2004 |
| KR | 1020010094818 | 11/2001 |
| KR | 100486631 | 5/2005 |
| KR | 100748843 | 8/2007 |

\* cited by examiner

*Primary Examiner* — Gregory L Huson
*Assistant Examiner* — Janie Christiansen
(74) *Attorney, Agent, or Firm* — IP & T Group LLP

(57) ABSTRACT

A washbasin includes: a washbasin body having a water containing space and comprising an insertion hole formed in a front surface thereof in a downward inclined direction and a drain hole formed on the bottom surface thereof; a water supply nozzle projected toward the water containing space through the insertion hole from a rear end of the washbasin body, wherein the projected portion of the water supply nozzle is rotated in a direction desired by a user so as to control a water supply direction and a water supply amount; a cold/hot water supply valve buried in a one-side edge of the washbasin body and coupled to the water supply nozzle through a pipe; and a cold/hot selection level installed on the top surface of the cold/hot water supply valve and selectively supplying cold/hot water to the water supply nozzle.

8 Claims, 7 Drawing Sheets

WASHBASIN

CROSS-REFERENCE TO RELATED APPLICATIONS

This application is a continuation of PCT/KR2010/002117 filed on Apr. 7, 2010, which claims priority of Korean patent application number 10-2009-0054842 filed on Jun. 19, 2009. The disclosure of each of the foregoing applications is incorporated herein by reference in its entirety.

BACKGROUND OF THE INVENTION

The present invention relates to a washbasin, and more particularly, to a washbasin which includes a rotatable water supply nozzle protruded at a minimum length from the washbasin and mounted as a substitute part of a faucet to secure a sufficient washing space and a hot and cold water supply unit coupled to the water supply nozzle and mounted in the washbasin to increase user's convenience and stability.

Recently, as the standard of living is increased with industrialization, the bathroom culture has changed. In particular, the designs of facilities inside a bathroom, such as a bathtub, a washbasin, and a toilet have been changed into graceful forms to exhibit an elegant bathroom atmosphere, and various functions have been added to conveniently use the facilities.

Meanwhile, a water supply unit attached to a general washbasin which is used in a daily life jets water through a water pipe. The structure of the water supply unit will be briefly described as follows.

FIG. 1 illustrates an example of a conventional washbasin.

Referring to FIG. 1, the washbasin is one of bathroom facilities for washing hands or face and includes a water containing portion for containing water, a drain hole installed at the center of the bottom of the water containing portion, a faucet installed at a leading end of the top surface of the water containing portion, and a water supply unit having a cold/hot water button. The water supply unit supplies water through a water pipe.

In particular, the washbasin has a structure in which a one-touch manipulation handle and a water supply nozzle of the water pipe protruded from a central portion of the washbasin are installed to protrude forward. The washbasin having the above-described structure includes the following various problems.

First, the conventional washbasin has a structure in which the one-touch manipulate handle and the water supply nozzle of the water pipe protruded at the central portion of the washbasin are installed to protrude forward. Therefore, since a user has such a feeling of uneasiness that the user may bump the head against the water pipe while washing the face, the user washes the face in a state where the user does not sufficiently bend the back. Therefore, the user's posture becomes uncomfortable, and water may flow down along both arms to wet the user's clothes.

Second, the water supply nozzle has a structure of jetting water downward. Therefore, since the water continuously flows down even while a user washes the face, a large amount of water may be wasted. Some faucets have a structure of rotating 360 degrees. In this case, however, when a valve is opened in a state where the water jetting direction is rotated 180 degrees, a large amount of water may be jetted toward the user by the water jetting pressure, thereby wetting the user's clothes. In this structure, since the water pipe is also protruded, a user may have such a feeling of uneasiness that the user may bump the head against the protruded water pipe. Accordingly, users tend to avoid using the washbasin.

Third, even when a user washes the hair in the washbasin, the user may not wash the hair normally, because of the protruded water pipe of the water supply unit. Although the user may wash the hair, the user inevitably washes the hair in a very uncomfortable posture. Furthermore, when a user rinses the mouth after brushing the teeth, the user should turn the head to receive water with the mouth or use a separate cup to rinse the mouth.

Fourth, since the cold/hot water button installed in the conventional washbasin is positioned at the top surface of the washbasin, short kids may have difficulties in manipulating the cold/hot water button.

Fifth, the water pipe and a manipulation lever of the supply unit may be smeared with water dropping through the water pipe or contaminated water such as soapy water. In this case, since the conventional washbasin has a structure in which the water pipe and the manipulation lever are protruded to the outside, it is very inconvenient to remove the contaminated water stuck between the washbasin and the water pipe or the manipulation lever. Furthermore, although the contaminated water adhering to the water supply unit is removed at any time, moisture remaining on a packing of the adherence surface may rot to cause mold or unsanitary conditions. In this case, the visual appearances of the bathroom and the washbasin may be degraded.

Sixth, the washbasin has an internal structure which is heavily dented toward the front of a user and forms a rounded inclined surface. Therefore, when water contained in the washbasin overflows while slopping from side to side, the water may wet user's clothes, and the floor may be soaked with the water. In this case, a safety accident may occur due to a slip.

Seventh, a secretion such as spit frequently occurs during washing. The conventional washbasin has no proper unit to receive and discharge the secretion.

Eighth, since the conventional washbasin does not include a soap holder, a separate soap case or holder should be provided. Furthermore, when the soap case is filled with water, soap may be steeped with the water and unnecessarily consumed.

SUMMARY OF THE INVENTION

An embodiment of the present invention is directed to a washbasin which includes a cold/hot water supply valve buried in a washbasin body and an outlet exposed at a minimum length from the surface of the washbasin body and buried to be rotated 360 degrees, and couples the outlet to the cold/hot water supply valve to secure a water containing space as much as possible such that a user conveniently washes the face or hair or easily rinse the mouth after brushing the teeth.

Another embodiment of the present invention is directed to a washbasin which includes a cold/hot water selection lever mounted on an edge of the top surface of a washbasin body and controlling cold/hot water supplied from a cold/hot water supply valve, such that kids may easily control a cold/hot water manipulation.

Another embodiment of the present invention is directed to a wash basin includes a soap holder installed at a predetermined position of the washbasin. Therefore, a separate soap case which may be moved here and there is not necessary, and soap may be prevented from being steeped and unnecessarily consumed.

Another embodiment of the present invention is directed to a wash basin which includes an overflow prevention bump formed at a boundary portion with a garbage hole to distribute the surface tension of water contained in a water containing space, thereby preventing the water contained in the washbasin from slopping when a user washes the face or rinses a towel. The garbage hole is separately provided to discharge secretion such as spit, the overflow prevention bump separates floating matters such that the separated floating matters flow toward the garbage hole according to the gravity.

In accordance with an embodiment of the present invention, a washbasin includes: a washbasin body having a water containing space and including an insertion hole formed in a front surface thereof in a downward inclined direction and a drain hole formed on the bottom surface thereof; a water supply nozzle projected toward the water containing space through the insertion hole from a rear end of the washbasin body, wherein the projected portion of the water supply nozzle is rotated in a direction desired by a user so as to control a water supply direction and a water supply amount; a cold/hot water supply valve buried in a one-side edge of the washbasin body and coupled to the water supply nozzle through a pipe; and a cold/hot selection lever installed on the top surface of the cold/hot water supply valve and selectively supplying cold/hot water to the water supply nozzle.

The water supply nozzle may include: a socket coupled to the cold/hot water supply valve and having a passage hole formed in an axial direction thereof so as to pass water; a partition installed on an inner surface of the socket to partially block the passage hole and having a water passing hole formed in one side thereof; a nozzle body coupled to the socket so as to rotate 360 degrees and including an outlet having one end projected at a minimum length toward the water containing space of the washbasin body and communicating with the passage hole; and a water supply amount control unit mounted inside the rear portion of the nozzle body so as to overlap the partition and having a plurality of communication holes having different sizes, which communicate with the water passing hole of the partition to control the water supply amount according to the rotation of the nozzle body.

The water supply amount control disk may have a lower end portion which is horizontally cut so as not to be rotated together with the nozzle body, the partition and the water supply amount control disk may be closely attached to each other with such a tolerance for water to leak, and the communication holes of the water supply amount control unit may have the same shape and size as the water passing hole of the partition, and include a first hole formed in a fan shape of which the upper circular arc is larger than the lower circular arc and a second hole formed in a circular shape smaller than the first hole.

The water supply nozzle may further include: a vortex generation plate projected from a central upper portion of the inner surface of the nozzle body in a radial direction, and generating a vortex of water such that water provided from the water passing hole of the partition is smoothly jetted to the outside without being rapidly discharged, an aerator installed inside the leading end portion of the nozzle body, controlling a water flow rate to perform a water saving function, and preventing water from splashing; and a nozzle cap installed an outer surface of the lead end portion of the nozzle body and preventing the aerator from being detached.

The washbasin body may include a garbage hole formed concavely in an edge of the top surface of the washbasin body, and discharging secretion occurring when the user washes the face; an overflow prevention bump formed at the boundary between the garbage hole and the water containing space such that contaminated water flows toward the garbage hole according to the gravity, and distributing surface tension of the water contained in the water containing space to prevent the water from slopping and overflowing; and a soap case holder groove coupled to the garbage hole.

The washbasin body may further include a plurality of vertical breakwater stairs formed in the inner surface of the water containing space of the washbasin body, stepped along the inner inclined surface of the washbasin body, and preventing the water contained in the water containing space from slopping and overflowing toward the front of the user, when the user washes the face.

The cold/hot water supply valve may include: a housing including a housing groove for housing a valve-related device therein, a gap prevention protrusion protruded from an inner wall surface of the housing groove and preventing a gap from a water supply plate, and a cold/hot water flow path groove formed on the bottom of the housing groove to control an inflow/outflow of cold/hot water and coupled to a cold/hot water supply pipe; a water supply plate installed over the cold/hot water flow path groove; a cold/hot water selection plate placed on the top surface of the water supply plate, closely coupled with the water supply plate, and selectively supplying cold/hot water; and a water supply selection valve flow plate installed over the cold/hot water selection plate, and turned right and left at a predetermined angle together with the cold/hot water selection plate on the water supply plate so as to provide a supply path of cold/hot water.

DESCRIPTION OF SPECIFIC EMBODIMENTS

Figure 1:
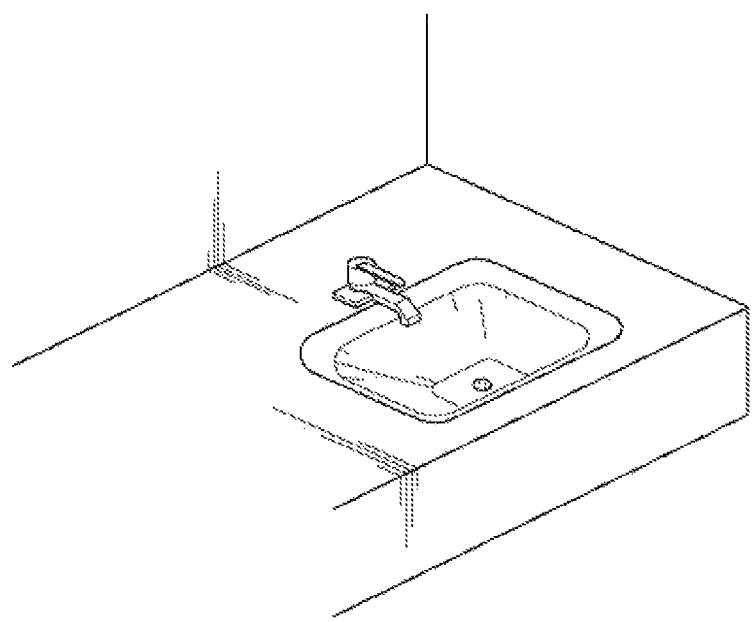
FIG. 1 illustrates an example of a conventional washbasin.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a washbasin according to an embodiment of the present invention will be described with reference to FIGS. 2 to 11.

The washbasin according to the embodiment of the present invention has a structure in which a cold/hot water supply valve is installed in the washbasin and a water supply nozzle is projected at a minimum length from the surface of the washbasin. In this structure, since an outlet of the water supply nozzle is rotatably provided, a user may conveniently and stably wash the face, and control a water supply amount to save water.

Figure 2:
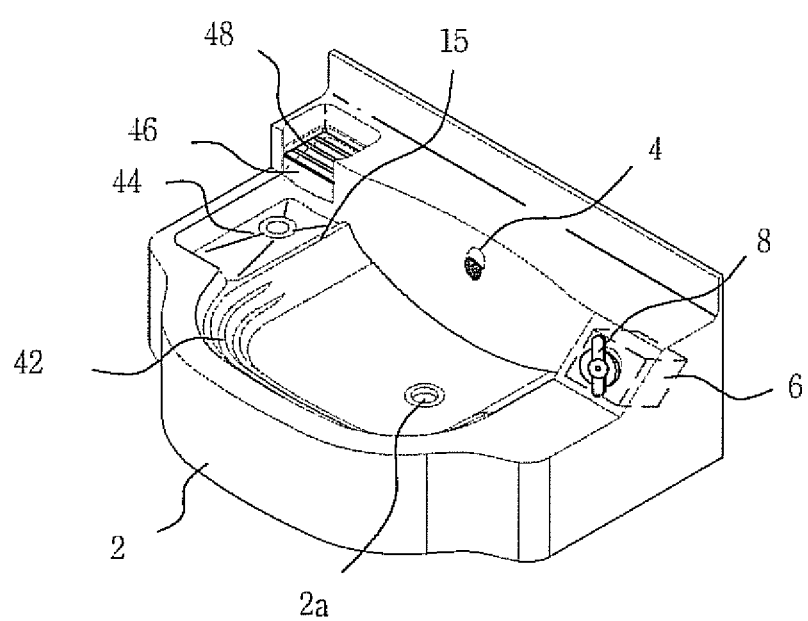
FIG. 2 is a perspective view of a washbasin according to an embodiment of the present invention.
Figure 3:
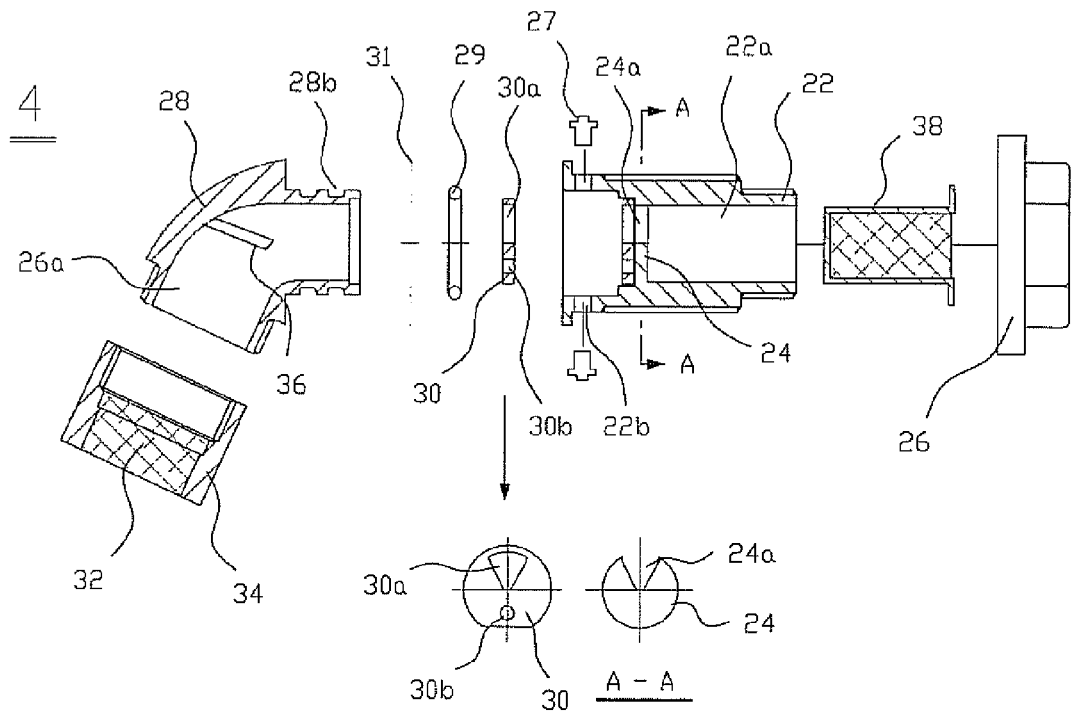
FIG. 3 is an exploded cross-sectional view of a water supply nozzle capable of controlling a water supply direction and a water supply amount.
Figure 4:
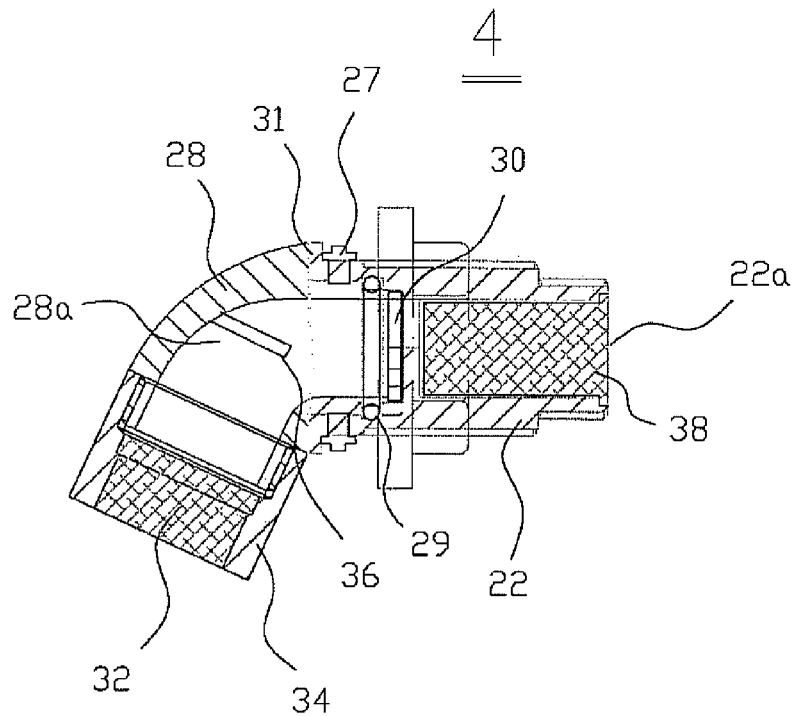
FIG. 4 is an assembled cross-sectional view of the water supply nozzle of FIG. 3.

FIG. 2 is a perspective view of the washbasin according to the embodiment of the present invention. FIG. 3 is an exploded cross-sectional view of the water supply nozzle capable of controlling a water supply direction and a water supply amount. FIG. 4 is an assembled cross-sectional view of the water supply nozzle of FIG. 3.

Referring to FIGS. 2 to 4, the washbasin according to the embodiment of the present invention includes a washbasin body 2, a water supply nozzle 4, a cold/hot water supply valve 6, and a cold/hot water selection lever 8. The washbasin body 2 has a water containing space and includes an insertion hole formed at the front surface thereof in a downward inclined direction and a drain hole 2a formed in the bottom surface thereof. The water supply nozzle 4 is projected toward the water containing space through the insertion hole from the rear surface of the washbasin body 2. The projected portion of the water supply nozzle 4 may be rotated in a direction desired by a user to control the water supply direction and the water supply amount. The cold/hot water supply valve 6 is buried in a one-side edge of the washbasin body 2 and connected to the water supply nozzle 4 through a pipe. The cold/hot water select lever 8 is installed on the top surface of the cold/hot water supply valve 6 and serves to selectively supply cold/hot water toward the water supply nozzle 4.

Here, the water supply nozzle 4 includes a passage hole 22a formed in an axial direction thereof and a socket 22 having a plurality of fixation pins 22b formed at the leading end thereof. The passage hole 22a is connected to the cold/hot water supply valve 6 so as to pass water. The socket 22 includes a partition 25 integrated therein. The partition 25 blocks the passage hole 22a and includes a water passing hole 24a formed at one side thereof. The socket 22 having the above-described structure is fixed to the wall surface through a fixation screw 26.

The socket 22 is coupled to a nozzle body 28 having an one end projected at a minimum length toward the washbasin and an outlet 28a communicating with the passage hole 22a. The nozzle body 28 may be rotated 360 degrees. The nozzle body 28 has such a tolerance as to be fitted into the socket 22 such that the projected portion thereof is positioned in a direction desired by a user, even though the nozzle body 28 may be rotated 360 degrees.

The nozzle body 28 has a packing groove 28b formed on the outer circumferential surface thereof. The packing groove 28b is inserted into the socket 22 to perform a water sealing action. A rubber packing 29 is attached into the packing groove 28b, and a rubber packing 31 is attached to a surface where the nozzle body 28 and the socket 22 are contacted with each other, in order to maintain the watertightness between the socket 22 and the nozzle body 28. Furthermore, the socket 22 has a fixation pin hole 22b coupled to a fixation pin 27 which fixes the nozzle body 28 so as not to be detached from the socket 22.

The nozzle body 28 coupled to the socket 22 is formed in an elbow pipe shape bent at a predetermined inclined angle. The nozzle body 28 jets water toward the front of the user when the outlet 28a is positioned to face downward, and jets water to drop in an arc when the outlet 28a is rotated 180 degrees and positioned at a long distance from the user.

The nozzle body 28 includes a water supply amount control disk 30 mounted inside the rear end portion thereof and overlapping the partition 24. The water supply amount control disk 30 includes a plurality of first and second holes 30a and 30b communicating with the water passing hole 24a of the partition 24. The first and second holes 30a and 30b have different sizes to control the water supply amount according to the rotation of the nozzle body 28. Furthermore, the lower end portion of the water supply amount control disk 30 is horizontally cut so as not to be rotated together with the nozzle body 28.

Here, the water passing hole 24a of the partition 24 and the first hole 30a of the water supply amount control disk 30 have the same size. The partition 24 is formed in a fan shape of which the upper circular arc is smaller than the lower circular arc, and the second hole 30b is formed in a circular shape smaller than the first hole 30a.

In FIG. 3, a diagram indicated by an arrow corresponds to a front view of the water supply amount control disk 30.

According to the water supply nozzle 4 having such a structure, when water is jetted in the downward direction, the water passing hole 24a and the first hole 30a communicate with each other to maximize the water supply amount. Furthermore, when the nozzle body 28 is rotated 180 degrees to jet water in the upward direction, the water passing hole 24a and the second hole 30b communicate with each other to jet a proper amount of water such that a user may rinse the mouth after washing the face or brushing the teeth.

The partition 24 and the water supply amount control disk 30 are closely attached to each other with such a tolerance for water to leak. Therefore, when the nozzle body 28 is fitted into the socket 22, the amount of water jetted when the nozzle body 28 is rotated 90 degrees is controlled to the smallest amount by the tolerance maintained between the partition 24 and the water supply amount control disk 30. In this case, the jetted water is supplied into the washbasin without deviating from the washbasin. As described above, the water supply amount may be controlled differently according to the water supply direction of the water supply nozzle 4.

The nozzle body 28 includes an aerator 32 mounted inside the leading end portion thereof. The aerator 32 controls a water flow rate to perform a water saving function and prevents water from splashing. Furthermore, the nozzle body 28 includes a nozzle cap 34 mounted on the outer surface of the leading end portion thereof. The nozzle cap 34 prevents the aerator 32 from being detached. The structure of the aerator 32 and the nozzle cap 34 weakens a water flow which is spread when the water is jetted, and forms bubbles to smoothly jet water without a splash.

The nozzle body 28 may further include a vortex generation plate 36 formed on a central upper portion of the inner surface thereof. The vortex generation plate 36 induces and generates a vortex of water supplied from the water passing hole 24a such that the water is smoothly jetted.

The socket 22 includes a foreign matter introduction prevention mesh 38 installed in the water passing hole 22a. The foreign matter inflow prevention mesh 38 prevents the inflow of foreign matters such as sand.

The washbasin body 2 includes a garbage hole, a soap holder, and an overflow prevention bump, in addition to the water containing function. The overflow prevention bump serves to prevent water contained in the water containing space from overflowing while splashing. These components will be described in more detail as follows.

Referring to FIG. 2, the overflow prevention bump 15 formed between the garbage hole 44 and the inner surface of the water containing space prevents water contained in the water containing space from overflowing toward the front of a user, and the garbage hole 44 for discharging secretions such as spit is formed in an edge of the top surface of the washbasin body 2. Furthermore, the overflow prevention bump 15 formed at the boundary portion between the garbage hole 44 and the water containing space serves to separate contaminated water such as soapy water such that the contaminated water may flow toward the garbage hole 44 according to the gravity.

A soap case holder groove 46 connected to the garbage hole 44 is formed on an edge of the top surface of the wash basin body 2. A soap holder 48 including a plurality of bars formed in the bottom surface thereof is received in the soap case holder groove 46. Since water may leak between the plurality of bars of the soap holder 48, soap may be easily dried. The soap case holder groove 46 guides soapy water dropping from the soap holder 48 toward the garbage hole 44.

According to the structure of the above-described washbasin body 2, when a user washes the face in a state in which water is contained in the washbasin body 2, the water flows over the overflow prevention bump 15 formed between the garbage hole 44 and the water containing space toward the garbage hole 44. Therefore, as the surface tension of the water contained in the water containing space becomes weak, the water is prevented from overflowing toward the front of the user.

Secretion such as spit, which may occur while a user washes the face, may be easily discharged through the garbage hole 44. Furthermore, when the water contained in the water containing space of the washbasin body 2 overflows after the user finishes washing in a state where the faucet is left running, the water flows over the bump 14 toward the garbage hole 44 according to the gravity. Therefore, the water is prevented from overflowing.

Since the soap holder 48 is received in the soap case holder groove 46, the user may easily use soap. Furthermore, soapy water dropping from the soap after use drops between the bars of the soap holder 48 and then flows toward the garbage hole 44. Furthermore, as a sufficient space between the soap case holder groove 46 and the soap holder 48 is maintained, ventilation is smoothly performed to quickly dry the soap. Therefore, it is possible to prevent the soap from being unnecessarily consumed.

Now, the structure of the cold/hot water supply valve will be described with reference to FIGS. 8 and 9.

Figure 8:
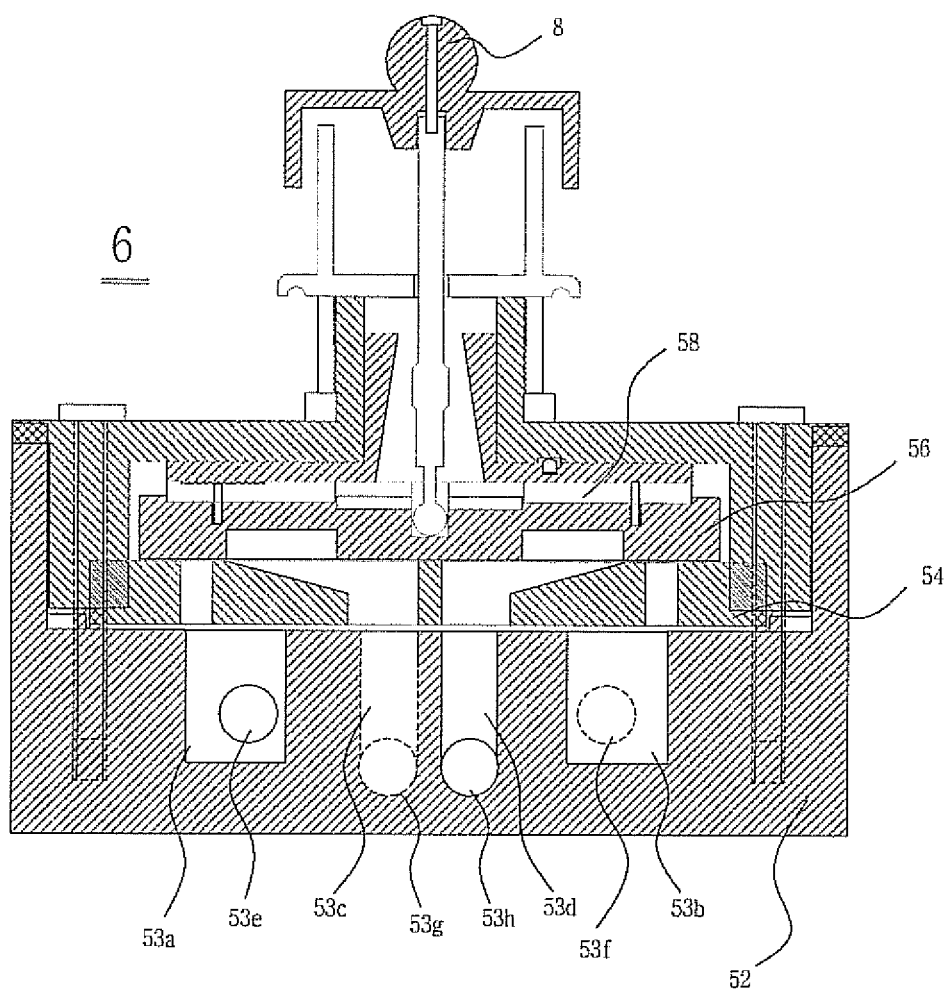
FIG. 8 is a cross-sectional view of a cold/hot water supply valve.
Figure 9:
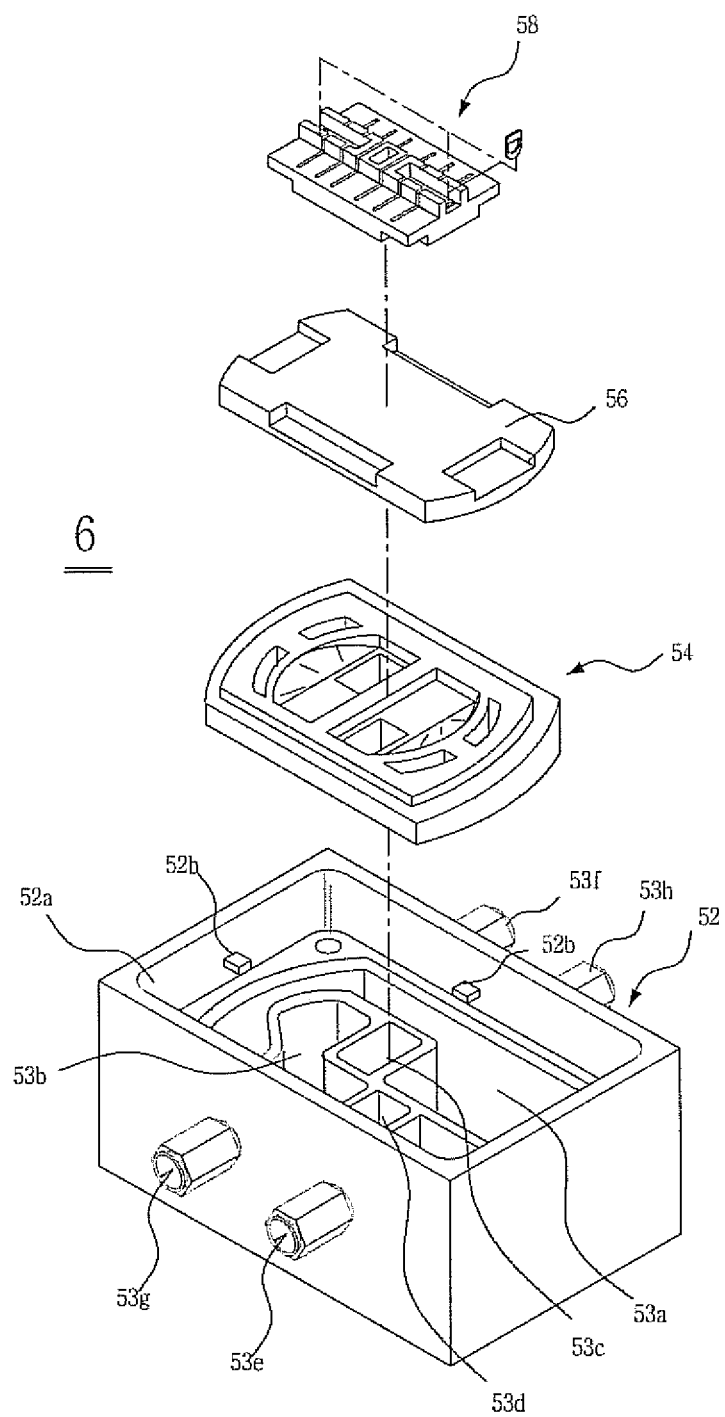
FIG. 9 is an exploded perspective view of the cold/hot water supply valve.

Referring to FIGS. 8 and 9, the cold/hot water valve 6 includes a housing 52, a water supply plate 54, a cold/hot selection plate 56, and a water supply selection valve flow plate 5B. The housing 52 includes a housing groove 52a for housing a valve-related device therein, a gap prevention protrusion 52b protruded from an inner wall surface of the housing groove and preventing a gap from a water supply plate which will be described below, and a cold/hot water flow path groove formed on the bottom of the housing groove 52a to control an inflow/outflow of cold/hot water and coupled to a cold/hot water supply pipe. The water supply plate 54 is installed over the cold/hot water flow path groove. The cold/hot water selection plate 56 is placed on the top surface of the water supply plate 54 and closely coupled to the water supply plate 54, and serves to selectively supply cold/hot water. The water supply selection valve flow plate 58 is installed over the cold/hot selection plate 56, and turned left and right at a predetermined angle so as to provide a supply path of cold/hot water.

In the structure of the cold/hot water supply valve 6, the cold/hot water flow groove includes cold/hot water supply grooves 53a and 53b, water-jetting-direction and bathtub-direction outlet grooves 53c and 53d, first and second water supply holes 53e and 53f, and first and second outlets 53g and 53h. The cold/hot water supply grooves 53a and 53b are divided into two regions having an arbitrary size. The water-jetting-direction and bathtub-direction outlet grooves 53c and 53d are formed with a partition wall provided in the central portion thereof and penetrated in a side direction. The first and second water supply holes 53e and 53f pass through a side surface of the housing 52 from the cold/hot water supply grooves 53a and 53b. The first and second outlets 53g and 53h pass through a side surface of the housing 52 from the water-jetting-direction and bathtub-direction water outlet grooves 53c and 53d.

The cold/hot water supply valve 6 having the above-described structure supplies cold water, hot water, or a cold/hot water mixture to the water supply nozzle 4 according to a manipulation of the hot/water selection lever 8.

According to the embodiment of the present invention, the operation state of the water supply nozzle will be described with reference to FIGS. 5 to 7, 10, and 11.

Figure 5:
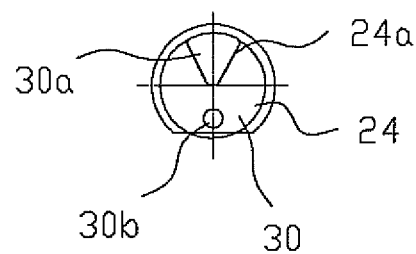
FIGS. 5 to 7 illustrate the operation state of the water supply nozzle capable of controlling the water supply amount according to the operation of a water supply amount control disk of the water supply nozzle according to the embodiment of the present invention.
Figure 6:
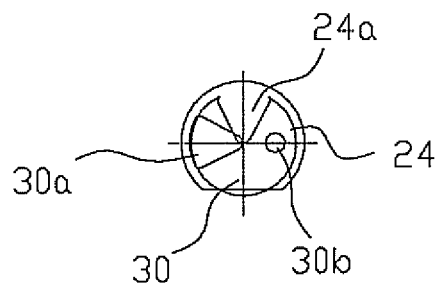
Figure 7:
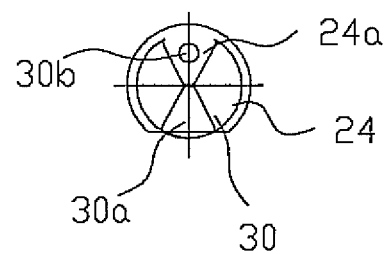
Figure 10:
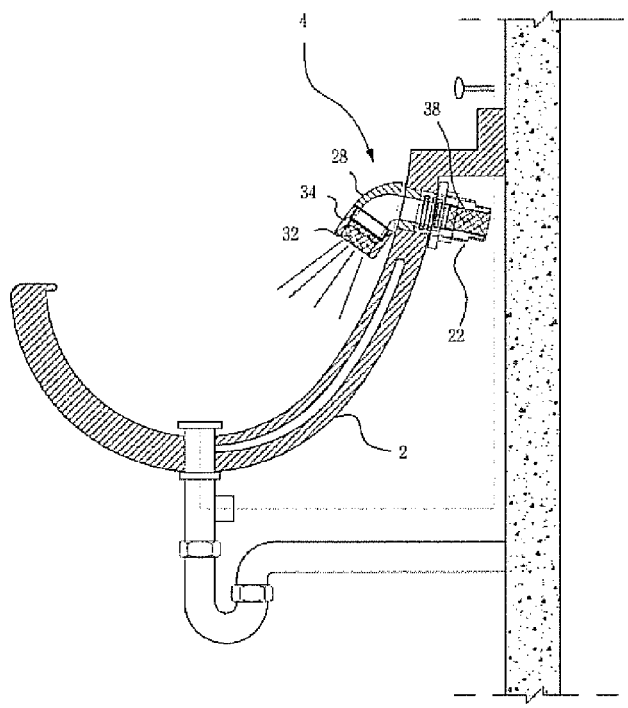
FIG. 10 is a cross-sectional view showing a water jetting process when an outlet of the water supply nozzle is positioned to face downward.
Figure 11:
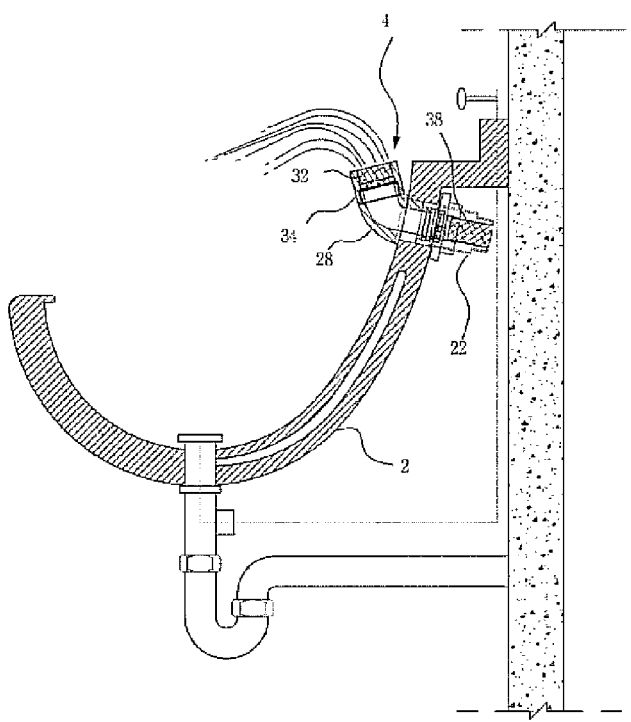
FIG. 11 is a cross-sectional view showing a water jetting process when the outlet of the water supply nozzle is positioned to face upward.

FIGS. 5 to 7 illustrate the operation state of the water supply nozzle capable of controlling the water supply amount and the water supply direction. FIG. 5 is a diagram illustrating an arrangement of the water passing hole and the first and second holes when the outlet of the nozzle body is positioned to face the downward direction. FIG. 6 is a diagram illustrating an arrangement of the first and second holes when the nozzle body is rotated 90 degrees. FIG. 7 is a diagram illustrating an arrangement of the water passing hole and the first and second holes when the outlet of the nozzle body is rotated 180 degrees from the initial position so as to face upward. FIG. 10 is a cross-sectional view showing a water jetting process when the outlet of the nozzle body is positioned to face downward. FIG. 11 is a cross-sectional view showing a water jetting process when the outlet of the nozzle body is positioned to face upward.

First, referring to FIGS. 5 to 7, a process of controlling the water supply amount and the water jetting direction will be described.

Referring to FIG. 5, when the outlet 28a of the nozzle body 28 faces downward, the water passing hole 24a of the partition 24 and the first hole 30a of the water supply amount control disk 30 communicate with each other to jet a maximum amount of water. In this state, a sufficient amount of water is supplied into the washbasin so as to quickly fill the water containing space, as illustrated in FIG. 10. Furthermore, since only the outlet 28a of the nozzle body 28 is protruded to the washbasin, a user may comfortably use the washbasin, without a feeling of uneasiness that the user may bump the head against the outlet when washing the hair or face.

When the nozzle body 28 is rotated 90 degrees, the water passing hole 24a and the first and second holes 30a and 30b are positioned to deviate from each other, as illustrated in FIG. 6. In this case, when water is jetted, the water supply amount is reduced by the tolerance between the partition 24 and the water supply amount control disk 30.

Referring to FIG. 7, when the user wants to rinse the mouth or wash the face after brushing the teeth, the user may rotate the outlet 28a of the nozzle body 28 by 180 degrees from the original position as illustrated in FIG. 5. Then, the water passing hole 24a and the second hole 30b communicate with each other. In this case, although the second hole 30b has a smaller size than the first hole 30a, a larger amount of water is jetted than when the nozzle body 28 is rotated 90 degrees, and drops down in an arch as illustrated in FIG. 11. Therefore, the user may conveniently wash the face, and rinse the mouth without a separate cup.

According to the embodiment of the present invention, the following effects may be implemented.

First, since the water supply nozzle is protruded at a minimum length from the surface of the washbasin, the washing space may be sufficiently secured, and the user may conveniently and stably wash the face or hair without a feeling of uneasiness that the user may bump the head against the water supply nozzle.

Second, since the water supply nozzle is constructed to rotate 360 degrees, the position of the outlet may be controlled to a position desired by the user such that the user may rinse the mouth at a comfortable position after brushing the teeth, and the water supply amount may be controlled differently according to the rotation of the outlet. In the conventional washbasin, since the projected water supply valve has a structure of jetting water downward, the water continuously flows while the user uses the hands to scoop up water and face the face. Therefore, a large amount of water is consumed. According to the embodiment of the present invention, however, when the water supply nozzle is rotated to face upward and a proper amount of water is directly jetted onto the face, the user may wash the face with a small amount of water. Therefore, it is possible to save water consumption.

Third, in the washbasin according to the embodiment of the present invention, the water pipe and so on for jetting water are not protruded, but only the water supply nozzle is protruded at a minimum length. Therefore, although contaminated water such as soapy water drops onto the portion where the water supply nozzle of the washbasin is attached, the water flows down along the inclined surface. The portion may be quickly dried, and easily cleaned. Therefore, it is possible to create a pleasant bathroom environment.

Fourth, the garbage hole is provided on the edge of the top surface of the washbasin to easily discharge secretion such as spit when the user washes the face. As the separate soap case holder space is provided at one side of the garbage hole, a separate soap case which may be moved here and there is not necessary, and the soap may be prevented from being unnecessarily consumed.

Fifth, as the overflow prevention bump is formed at the boundary portion between the water containing space and the garbage hole, the water overflowing from the water containing space may be passed toward the garbage hole through the overflow prevention bump. Furthermore, as the surface tension of the water contained in the water containing space becomes weak, the water may be suppressed from slopping and overflowing toward the user when the user faces the face or rinses a towel or the like. Furthermore, floating matters overflowing from the water containing space may be separated to flow toward the garbage hole according to the gravity.

Sixth, as the cold/hot water selection lever is disposed at the edge of the washbasin, kids may easily manipulate the cold/hot water selection lever.

While the present invention has been described with respect to the specific embodiments, it will be apparent to those skilled in the art that various changes and modifications may be made without departing from the spirit and scope of the invention as defined in the following claims.

The present invention may be applied to a washbasin provided in a bathroom, and the cold/hot water supply valve and the water supply nozzle according to the present invention may be applied as substitute parts of water pipes installed in a sink of a kitchen as well as water pipes installed in a bathroom.

What is claimed is:

1. A washbasin comprising:
   a washbasin body defining a water containing space, the washbasin body including:
      a bottom surface defining a drain hole,
      a concave garbage hole formed in an edge of a top surface of the washbasin body,
   an overflow prevention bump, formed at a boundary between the edge of the top surface of the washbasin, in which the garbage hole is formed, and the water containing space, the overflow prevention bump directing, via surface tension, water contained in the water containing space to the garbage hole to prevent the water from slopping or overflowing from the water containing space, and
      a soap case holder groove coupled to the garbage hole to guide water from a soap holder to the garbage hole; and
   a water supply nozzle projecting toward the water containing space from a rear end of the washbasin body, the water supply nozzle comprising:
      a socket coupled to a cold/hot water supply valve, located in a side of the washbasin body and coupled to the water supply nozzle through a pipe, the socket having a passage hole formed in an axial direction to pass water,
      a partition positioned on an inner surface of the socket to partially block the passage hole to form a water passing hole,
      a nozzle body rotatably coupled to the socket to rotate 360 degrees to control a direction of water supplied by the water supply nozzle, the nozzle body comprising:
         an outlet having one end projecting toward the water containing space of the washbasin body and communicating with the passage hole; and
         a water supply amount control unit positioned inside a rear portion of the nozzle body so as to overlap the partition, the water supply amount control unit including a plurality of communication holes of different sizes that may communicate with the water passing hole to control a water supply amount based on a communication hole, of the plurality of communication holes, selected by a rotation of the nozzle body; and
      a cold/hot selection lever located on a top surface of the cold/hot water supply valve to selectively supplying cold/hot water to the water supply nozzle.

2. The washbasin according to claim 1, further comprising:
   a vortex generation plate, radially projecting from an inner surface of the nozzle body, to generate a vortex in the water supplied by the water passing hole, so that the water supplied by the water passing hole is jetted from the nozzle body.

3. The washbasin according to claim 1, wherein the water supply amount control unit further comprises:
   a lower end portion that is horizontally cut so that the water supply amount control unit is not rotated by the rotation of the nozzle body,
   wherein the partition and the water supply amount control unit are attached to each other with a tolerance that allows water to leak if the plurality of communication holes and the water passing hole are not aligned, wherein a first communication hole, of the plurality of communication holes of the water supply amount control unit, has a shape and size that are substantially similar to a shape and size of the water passing hole of the partition, and wherein the first communication hole has a substantially fan-like shape, and a second communication hole, of the plurality of communication holes, has a generally circular shape with a smaller surface area than a surface area of the first communication hole.

4. The washbasin according to claim 1, further comprising:
an aerator positioned inside a leading end portion of the nozzle body, where the aerator is to perform a water saving function by controlling a water flow rate, and to prevent water from splashing; and
a nozzle cap positioned on an outer surface of the lead end portion of the nozzle body to prevent the aerator from being detached.

5. The washbasin according to claim 1, further comprising:
a foreign matter inflow prevention mesh positioned inside the water-passing hole to prevent an inflow of foreign matter.

6. The washbasin according to claim 1, wherein the nozzle body further comprises:
a rotatable elbow pipe that may be oriented in a downward direction to discharge water toward the water containing space or in an upward direction to discharge the water in an upward direction.

7. The washbasin according to claim 1, further comprising:
a plurality of breakwater stairs, formed on a surface of the water containing space, to prevent water contained in the water containing space from slopping and overflowing toward the front of the user.

8. The washbasin according to claim 1, wherein the cold/hot water supply valve comprises:
a housing comprising:
a housing groove to house a valve-related device,
a cold/hot water flow path groove positioned beneath the housing groove to control an inflow/outflow of cold/hot water and coupled to a cold/hot water supply pipe,
a water supply plate positioned over the cold/hot water flow path groove,
a gap prevention protrusion protruding from a surface of the housing groove to prevent a gap from the water supply plate, and
a cold/hot water selection plate positioned over a top surface of the water supply plate to selectively supply cold/hot water; and
a water supply selection valve flow plate positioned over over the cold/hot water selection plate, where the water supply selection valve flow plate is to be rotated, in combination with cold/hot water selection plate, to a predetermined angle to provide a supply path of cold/hot water.

* * * * *